(12) United States Patent
Mercier et al.

(10) Patent No.: US 7,343,410 B2
(45) Date of Patent: Mar. 11, 2008

(54) AUTOMATED CREATION OF APPLICATION DATA PATHS IN STORAGE AREA NETWORKS

(75) Inventors: Christina Woody Mercier, Scotts Valley, CA (US); Noel Christopher Melville, Santa Cruz, CA (US); Michael Carver Rieseberg, Scotts Valley, CA (US); Nabin Acharya, San Jose, CA (US); Truls Solheim Myklebust, Los Gatos, CA (US)

(73) Assignee: Finisar Corporation, Sunnyvale, CA (US)

( * ) Notice: Subject to any disclaimer, the term of this patent is extended or adjusted under 35 U.S.C. 154(b) by 527 days.

(21) Appl. No.: 09/896,408

(22) Filed: Jun. 28, 2001

(65) Prior Publication Data

US 2003/0005119 A1 Jan. 2, 2003

(51) Int. Cl.
G06F 7/00 (2006.01)
G06F 15/173 (2006.01)
G06F 17/30 (2006.01)

(52) U.S. Cl. ............ 709/225; 709/223; 709/218; 707/10

(58) Field of Classification Search ........ 709/213, 709/252, 225, 224, 226, 203, 220, 250, 229, 709/236, 218; 710/3, 316; 370/229, 360, 370/238, 252; 707/1, 10, 200, 205; 714/3-4, 714/26; 711/114, 168, 154
See application file for complete search history.

(56) References Cited

U.S. PATENT DOCUMENTS

| 5,692,124 | A | * | 11/1997 | Holden et al. ............. 713/201 |
|---|---|---|---|---|
| 5,828,832 | A | * | 10/1998 | Holden et al. ............. 713/201 |
| 5,941,972 | A | | 8/1999 | Hoese et al. |
| 6,041,381 | A | | 3/2000 | Hoese |
| 6,138,161 | A | | 10/2000 | Reynolds et al. |
| 6,195,336 | B1 | * | 2/2001 | Stumer ..................... 370/238 |
| 6,212,560 | B1 | * | 4/2001 | Fairchild .................. 709/223 |
| 6,389,432 | B1 | | 5/2002 | Pothapragada et al. .... 707/205 |
| 6,535,518 | B1 | * | 3/2003 | Hu et al. .................. 370/401 |
| 6,601,101 | B1 | * | 7/2003 | Lee et al. ................. 709/227 |
| 6,606,690 | B2 | * | 8/2003 | Padovano ................. 711/148 |
| 6,640,278 | B1 | * | 10/2003 | Nolan et al. ............... 711/6 |
| 6,732,104 | B1 | * | 5/2004 | Weber ..................... 707/10 |
| 6,751,702 | B1 | | 6/2004 | Hsieh et al. |
| 6,754,718 | B1 | * | 6/2004 | Dobberpuhl et al. ....... 709/250 |
| 6,757,753 | B1 | * | 6/2004 | DeKoning et al. .......... 710/38 |
| 6,762,997 | B1 | * | 7/2004 | Liu et al. .................. 370/238 |

(Continued)

OTHER PUBLICATIONS

U.S. Appl. No. 09/779,844, filed Feb. 9, 2001, Iwatani.

(Continued)

Primary Examiner—David Wiley
Assistant Examiner—Jude J Jean-Gilles
(74) Attorney, Agent, or Firm—Workman Nydegger

(57) ABSTRACT

A DataPath Engine coupled to a SAN provides automated storage provisioning between an application on a Storage Area Network (SAN) attached server and a data volume on a SAN attached storage subsystem. The apparatus provides a simple user interface that allows operators to use pre-created policies for criteria to select data paths that meet organizations uptime and performance requirements. The apparatus uses pathing methodologies to select the optimal data path from the candidates by rating SAN state, uptime, performance, and other key factors. This apparatus allows an enterprise to more efficiently and effectively manage and monitor large, complex, distributed SANs.

56 Claims, 10 Drawing Sheets

Block Diagram illustrating a system for performing Automated Provisioning within a SAN

U.S. PATENT DOCUMENTS

| | | |
|---|---|---|
| 6,801,992 B2 | 10/2004 | Gajjar et al. |
| 6,823,477 B1 * | 11/2004 | Cheng et al. .................. 714/26 |
| 6,834,326 B1 * | 12/2004 | Wang et al. ................. 711/114 |
| 6,944,152 B1 * | 9/2005 | Heil ........................... 370/360 |
| 2002/0133756 A1 * | 9/2002 | Jain ............................ 714/43 |
| 2004/0085347 A1 | 5/2004 | Hagarty, Jr. et al. |
| 2004/0088366 A1 | 5/2004 | McDougall et al. |
| 2004/0205089 A1 | 10/2004 | Alon et al. |
| 2004/0228290 A1 | 11/2004 | Graves |
| 2005/0086554 A1 | 4/2005 | Simes |
| 2005/0091221 A1 | 4/2005 | Harris et al. |
| 2005/0268152 A1 | 12/2005 | Yamaguchi et al. |
| 2006/0041656 A1 | 2/2006 | Li et al. |
| 2006/0071684 A1 | 4/2006 | Schwarz et al. |
| 2006/0080430 A1 | 4/2006 | Barsuk |
| 2007/0094354 A1 * | 4/2007 | Soltis ......................... 709/218 |

OTHER PUBLICATIONS

U.S. Appl. No. 10/028,010, filed Dec. 21, 2001, Soltis.

U.S. Appl. No. 09/885,290, filed Jun. 19, 2001, Markson et al.

U.S. Appl. No. 09/783,414, filed Feb. 14, 2001 Karamanolis et al.

* cited by examiner

200 SAN Architecture

FIG. 3

Steps to manually provision storage for a server (Prior Art):

STEP 251
A SAN administrator physically verifies that the server is connected to the storage subsystem by checking the fibre channel cabling from the server host bus adapter (HBA) to the fibre channel switch(es) and on to the target disk subsystem.

STEP 252
A SAN administrator uses a storage subsystem tool (or SAN management tool) to find a data volume of sufficient size.

STEP 253
A SAN administrator uses a storage subsystem tool to set mapping of the selected data volume to the desired host.

STEP 254
A SAN administrator makes a best guess as to the usage of various switched fabrics and paths and selects one or more paths from the server to the data volume.

STEP 255
A SAN administrator uses the SAN switch tool to verify that the physical connection is good by checking the name server data to see that the server (HBA) has successfully logged into the switch.

STEP 256
A SAN administrator uses the SAN switch tool to configure the fabric by setting the switch zones between the storage port and server HBA port.

STEP 257
Step 255 and 256 are repeated by the SAN administrator for every fabric used between the server and the data volume.

STEP 258
The SAN administrator uses the HBA interface tool to configure the HBA's on the server to set masking and mapping for the data volume that the server needs to access.

Block Diagram illustrating a system for performing Automated Provisioning within a SAN

FIG. 5

Steps for Automated Provisioning of Data Paths:

STEP 351
DataPath Engine software logic discovers all physical devices including switches, storage subsystems, servers, HBAs, data volumes and SAN appliances; all connections through the SAN including switch connections, server HBA connections and storage subsystem connections; all settings including switch zones, data volume maps, security settings, and SAN state; and displays the graphical topology of the SAN.

STEP 352
An Operator selects a create data path command from a graphical interface. The graphical interface provides a wizard that guides the operator through the data path creation and requests the operator to select an application and size of data volume (or existing data volume). Selection rules and policy is pre-created for each application.

STEP 353
DataPath Engine 302 selects the best data volume that meets the policy criteria. Best selection pathing methodology takes into consideration the state and activity of the SAN. DataPath Engine 302 discovers and selects physical paths through the SAN fabric from the selected data volume to the target application host that meet the criteria. Best selection pathing methodologies select the best path based upon the state and usage of the SAN.

STEP 354
The selected data paths are displayed for the operator. If the operator accepts the selection, DataPath Engine 302 configures settings on the HBA, storage device, data volume, and fabric switches to maximize security and allows accessibility to the data volume. The path settings and configuration data are saved.

FIG. 6

Example Rules that can be used for Data Path Selection criteria

| EXAMPLE RULES | DESCRIPTION | EXAMPLE VALUES |
|---|---|---|
| 451: Storage Type | The end point storage type | Disk, Tape, SSD, etc. |
| 452: Number of Threads or Channels | Sets the data path rule to the number different physical connections between server and data Volume that must be selected. Each Thread requires a different HBA port on the Application Server. | 1-10 |
| 453: Number of Fabrics or WANs | Sets the rule to the number of different switch fabrics to use for selection of each Thread above. Each fabric requires a different HBA port in the Application Server. | 1-10 |
| 454: Bandwidth | Sets the rule as to whether each Thread selected must be exclusive or shared. Exclusive Threads mean that no other Thread may share any portion of the physical connection and ports used. | Shared or Exclusive |
| 455: Data Volume Security | Sets the rule as to whether to select a storage subsystem where Data Volume mapping is used or not. Open does not use storage subsystems with Volume Mapping. | Secure or Open |
| 456: Data Volume Action | Sets the policy for action if a Data Volume map is modified by alternate SAN tools: Ignore (default for Open), Notify only, Notify and disable by hiding the data Volume from server, or Notify and override (change it back to original settings) | Ignore, Notify, Disable, Override |
| 457: Fabric Security | Sets the rule as to whether to select a switch with zoning enabled or not. Open does not use switches with zones. | Secure, Notify or Open |
| 458: Fabric Action | Sets the policy for action if a switch zone is modified by alternate SAN tools: Ignore (default for Open), Notify only, Notify and disable by hiding Volume from server, or Notify and override (change it back to original settings) | Ignore, Notify, Disable, Override |
| 459: HBA Security | Sets the rule as to whether HBA masking or mapping is used or not. Open does not use HBA security settings | Open, Secure |
| 460: HBA Action | Sets the policy for action if a HBA setting is modified by non-InterSAN software. (same as Fabric Action) | Ignore, Notify, Disable, Override |
| 461: Data Volume Size | Number of Gigabytes. The closest Volume size will be discovered. | 1-99999 |
| 462: Volume Pooling | Use more than one volume to meet size requirements | Yes/no |
| 463: Data Volume Char | Type of RAID characteristics of the data volume | RAID 0,1,3,5, etc |
| 464: Data Path Stat | Status of data path: Enabled or Disabled | Enable or Disable |

Pathing Methodology for optimal data path selection (Process 550)

Pathing Methodology for optimal data path selection (continued)

AUTOMATED CREATION OF APPLICATION DATA PATHS IN STORAGE AREA NETWORKS

BACKGROUND OF THE INVENTION

The invention relates generally to the field of managing storage in a networked storage environment and, in particular, relates to the systems and methods for provisioning storage and paths, including devices in the path, to storage in storage networks.

Traditional computer storage architectures consist of dedicated storage devices connected to corresponding computer servers, an example of which is illustrated in FIG. 1. However, the direct attachment of storage to corresponding servers does not support sharing of the storage infrastructure by multiple servers. Thus, this architecture has major limitations, such as, for example, capacity and performance constraints, difficulty of management, reduced availability, and susceptibility to disasters.

The Storage Area Network (commonly known as "SAN") is a relatively new storage architecture that provides any-to-any connectivity between servers and storage at high (e.g., gigabit) speeds, allowing an enterprise to scale and manage its storage infrastructure independently of its server resources. For purposes of this invention, SAN is defined to include a storage network connecting a distributed and heterogeneous collection of compute servers, storage infrastructure, and special purpose, storage-service appliances. FIG. 2 illustrates a conventional SAN architecture 200 having computer servers 202, a switching network 204 and a storage infrastructure 206. Switching network 204 provides bi-directional coupling between servers 202 and storage infrastructure 206. Thus, SAN architecture 200 provides "any to any" connectivity between any servers 202 and a device of storage infrastructure 206, allowing heterogeneous collections of servers to share the same storage infrastructure. Information technology (IT) managers are implementing SAN technology to increase performance, consolidate and share storage resources, intermix best of class storage components, manage their storage in a centralized manner, and gain the availability features. In particular, the SAN architecture supports powerful new data management concepts in support of backup, replication, and availability. For example, such "management" typically includes some or all of discovery, monitoring, topology creation, naming, persistence, data volume creation, switch security, data volume security, and authentication. A data volume is a single logical unit exported by a storage subsystem to a computer server. It may consist of many physical discs, portions of discs, or a data tape, but looks like one contiguous space to a server.

Unfortunately, conventional SAN management tools are typically server-based and have little or no inherent knowledge of the SAN special-purpose hardware and services such as replication services, snapshot engines, and virtualizers or SAN appliances. Conventional tools do not relate SAN storage and switch devices to applications and lines of business, and they don't automate the many processes required to allocate storage to applications. As a result, the actions required to be taken by IT management to put SAN data management concepts into practice are very complex, and are becoming even more so as SAN infrastructures become more complex.

"Today, most enterprises create data paths using a collection of device specific tools while referring to spreadsheets for SAN device information. Some enterprises have written scripts to address the complexity of storage provisioning in a SAN. These scripts have to be modified whenever new equipment is added to the SAN and executed by hand. In many cases they have selected one security mechanism rather than using all of the mechanisms to reduce complexity. In some cases, corporate databases have been created to maintain the settings of all the devices in the SAN although many organizations still use paper documents to keep track of current settings."

The conventional server-based SAN management tools typically provide only device-specific task management capability. FIG. 3 illustrates an example of the steps a SAN administrator would have to execute in order to provide a SAN attached server storage access using current un-automated, device-based SAN management tools.

At step 251, the SAN administrator physically verifies that the server is connected to the disc storage. At step 252, the SAN administrator finds a data volume of sufficient size. At step 253, the SAN administrator sets mapping of the selected data volume. At step 254, the SAN administrator selects one or more physical connections from the server to the storage subsystem with the data volume. At step 255, the SAN administrator verifies that the physical connection is good. At step 256, the SAN administrator configures the switch by setting security. Step 255 and 256 are repeated by the SAN administrator for every switch used. Finally, at step 258, the SAN administrator configures the host bus adaptor (HBAs), within the servers.

Thus, as can be seen from the example of FIG. 3, the SAN administrator that administers a conventional SAN has a lot of storage infrastructure knowledge and uses many different tools in order to effectively manage the SAN.

SUMMARY OF THE INVENTION

The present invention provides an efficient solution to the problem of implementation and management of a SAN. Preferred embodiments of the invention provide for both an apparatus and a method for automatic provisioning of storage to servers within a SAN. An operator, rather than a highly trained storage and switching expert, is able to perform automated provisioning which results in the creation of a data path between a server and data. A preferred embodiment of the present invention discovers and saves details of the SAN architecture, including, for example, server configurations, processes executable on specific servers and association of the processes with the server, devices and configurations of the switching network, and devices and configurations of the storage architecture. Devices, as used herein, are defined to include, for example, disc storage subsystems, tape storage subsystems, storage switches, storage routers, SAN appliances, and other storage devices such as solid state disc, etc.

Not only is static information determined, but dynamic information and state information as well. In the preferred embodiment, a DataPath Engine is provided which initiates, controls and monitors the discovering, saving, using, configuring, recommending and reporting associated with the preferred embodiment. The DataPath Engine calculates the optimal data path based upon the rules or policies specified and information learned about the SAN, including policies and rules defined in preconfigured templates for interaction with the DataPath Engine. As used herein, the term template is defined to include, for example, a list of defined rules and policies which define the storage characteristics and data path characteristics that must be used by the DataPath Engine for selection of a data path. The template is created in advance by an administrator using a graphical wizard, for example.

"A preferred embodiment of the present invention is directed towards a method of creating a data path for a process executing on a server coupled to a storage area network (SAN). The method includes parameterizing a set of attributes for a desired data path between the process and a device of the SAN; and constructing the data path that provides the set of attributes. For purposes of this application, the term attributes includes details about data volumes, security settings, performance settings, and other device and policy settings, and parameterizing is defined to include defaults selected by the system to help the administrator make better choices when creating a template which reflects data path policy and rules, with parameterizing attributes referring to an abstraction of the configuration, implementation and creation steps to identify the desired end product without necessarily specifying implementation details."

An alternate preferred embodiment of the present invention provides for a method of configuring a SAN. The method includes discovering, by use of a DataPath Engine coupled to the SAN, processes that are operable on a server coupled to the SAN; discovering, by use of the Data Path Engine coupled to the SAN, devices that are included in the SAN; responding, by use of the DataPath Engine coupled to the SAN, to a data path construction request from a user by providing the user with an interface to accept a set of attributes for a desired data path for one of the discovered processes; and constructing, by use of the DataPath Engine coupled to the SAN, the data path that provides the set of attributes.

In one aspect, the method of a preferred embodiment includes discovery of SAN device details; accepting policy and input regarding the type and size of data volume and path desired; and finding candidate data paths and volumes that meet the policy. The term policy and rules are important parts of the preferred embodiment of the present invention. Policy is defined to include actions which the DataPath Engine will take based upon events in the SAN and the term rules is defined to include characteristics of data volumes and data paths that the DataPath Engine must use to select candidate data paths for the application.

The data path may contain multiple channels or threads. A thread is a logical relationship representing a physical path between the server on which the application is resident and all of the devices, connections, ports and security settings in between. Further, for purposes of this application, threads are defined to include one or more of, depending upon the needs of the embodiment, application id, server id, HBA port id, HBA id, HBA security settings, switch port ids, switch security settings, storage subsystem port id, data volume id, data volume security settings, SAN appliance port id, SAN appliance settings. These relationships include, but are not limited to, the data volume; the storage subsystem the volume resides on; all ports and connections; switches; and SAN appliances and other hardware in the data path; the server with the Host Bus Adapter (HBA) where the application resides; and all applicable device settings. The data path selection is based upon policies such as, number of threads, number of separate storage switch fabrics that the threads must go through, level of security desired and actions to take based upon security problems detected, performance characteristics and cost characteristics desired. Data paths are created from SAN devices automatically discovered by the DataPath Engine (Applications, Servers, HBAs, Switches, Fabrics, Storage Subsystems, Routers, Data Volumes, Tape drives, Connections, Data Volume security, etc.). The data path can have multiple threads to the same data volume and span physical locations and multiple switched fabrics.

In another aspect, a preferred embodiment of the present invention is a method including an apparatus for selection and creation of the optimal data path among the candidate data paths. Pathing methodologies within the DataPath Engine use discovered information about the SAN such as device uptime information, performance information, cost information, and load. Device uptime information is defined to include, for example, the collection and persistence of data about when a device or connection or service is in service and available versus unavailable. Performance information is defined to include the collection and persistence of data about how each device is moving data from its location to the next and the resulting rate of data that the application is experiencing. Cost information is defined to include the correlation of cost information with actual devices used within a data path taking into consideration the percentage of the device used by the data path, when multiple data paths share the same devices. Cost in this case is a calculation of the infrastructure used. Many customers purchase expensive hardware in hopes of achieving high levels of availability. A calculation of the cost (switch ports used, HBA ports used, # gigabytes used) for each path may be provided for customers to analyze their cost for performance and availability achieved, as well as used as a "rule" when creating data paths.

Best practices information is also factored in as appropriate for the discovered devices, such as fan out ratios and switch fabric architecture which impacts performance once a new data path is added to the infrastructure.

Implementations of preferred embodiments of the invention provide for one or more of the following:

An operator with no storage or switch training uses a wizard on a graphical viewer to provision storage. Provisioning storage is defined to include creating a data path for a software application on a SAN attached server to a new or existing data volume.

Data path creation rules and policies are specified in a pre-created template. The template is expandable to include new rules as they are defined. A policy or template is created by a SAN administrator to meet the availability and performance needs of a software application on a SAN attached server. At storage provisioning time the proper template is automatically selected for the application. In some cases, predefined templates are provided and do not require creation by the SAN administrator. In some instances, for example, this is appropriate for standard implementations of common processes/applications.

Data path thread selection logic uses pathing methodologies that take into consideration the learned state and usage of the SAN.

Once the selected data path is approved by the operator, the DataPath Engine automatically configures SAN devices for data path creation across multiple devices, networks and locations.

Implementations of automated storage provisioning include but are not limited to, creation of data paths for an application, discovery of pre-existing data paths, reconfiguration of data paths, movement of data paths between asynchronous replications, and tuning of data paths based upon data collected about the SAN's performance and uptime. Advantages of the invention include the ability for a small number of operators to manage large, complex and distributed storage networks. They do not require detailed knowledge of storage networking devices or extensive training. Manual procedures and policies are automated for a huge time gain and reduction of personnel. Pathing methodologies calculate the best data paths rather than relying on experts or operator memory to select the optimal path during setup. Complex storage networking hardware and services can be added to storage networks and quickly incorporated into new or existing data paths.

Incorporating new devices into new or existing data paths is preferably done by adding new "rules" to the template. For example, a special purpose storage replication system is added to the SAN. A rule would be added to the DataPath Engine that allows a template to be created which selects a data path with the specified replication systems. New paths would be created using this template. Existing paths would be changed by data re-pathing. Re-pathing would allow an operator to select an alternate path to the existing volume or a replica of the volume (in another location) using a selected template. This capability, then, will support switching between replications as well as incorporating new devices into existing paths by changing to a new template (policy and rules). This also supports a change in performance characteristics and path optimization via a template with different settings than the original one used.

In an alternate preferred embodiment, the DataPath Engine stores the parameterization data or accesses a store of parameterization data used in the specification of existing data paths (including policies/templates/rules) used in guiding the generation of each existing data path. Periodically (automatically or operator initiated), the DataPath Engine reruns the pathing methodologies based upon the stored parameters to determine whether a new optimal data path exists. Depending upon specific embodiments, the data path may be changed automatically or the user may be requested to authorize the use of the new data path.

"Automated storage provisioning is a powerful system for enterprises with extensive storage networks to reduce their personnel requirements and better utilize their storage infrastructure. As used herein, the term automatic means that all the underlying SAN infrastructure and settings are configured by the DataPath Engine without administrator intervention based solely on a request specifying an application, data volume size and template. The above description refers to the construction of a data path."

Further understanding of the nature and advantages of the invention may be realized by reference to the remaining portions of the Specification and Drawings. In the drawings, similarly numbered items represent the same or functionally equivalent structures.

BRIEF DESCRIPTION OF THE DRAWINGS

The invention will be described with respect to particular embodiments thereof, and reference will be made to the drawings in which:

FIG. 3 illustrates the steps, which a SAN administrator must perform for the prior art of manually provisioning storage within the SAN architecture shown in FIG. 2;

FIG. 5 illustrates the steps the DataPath Engine and an operator to perform automated storage provisioning within the SAN architecture shown in FIG. 4;

FIG. 6 illustrates rules or policies that can be specified by a SAN administrator which the DataPath Engine uses to select data volumes and data paths for an application;

DESCRIPTION OF THE SPECIFIC EMBODIMENTS

Figure 1:
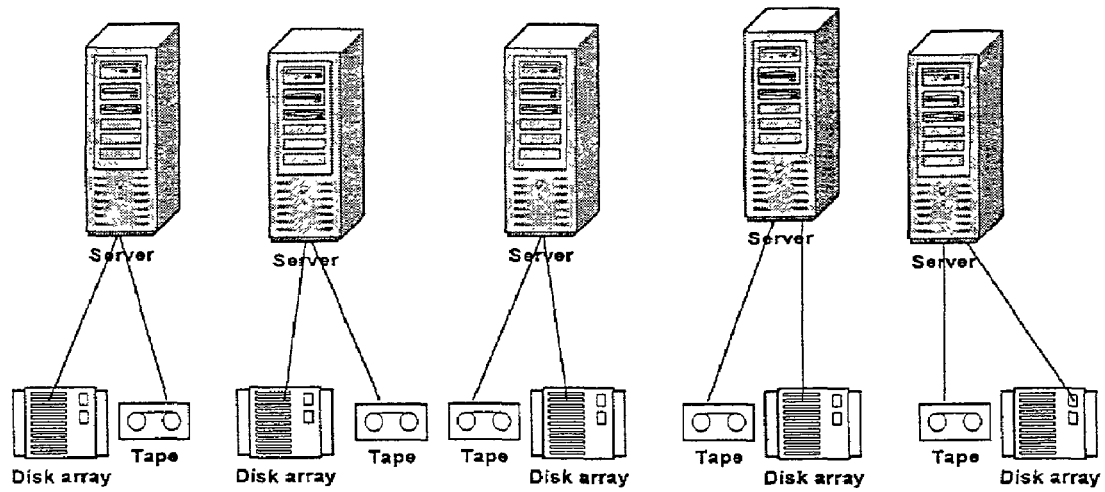
FIG. 1 illustrates the "direct attach" storage architecture of the prior art.
Figure 2:
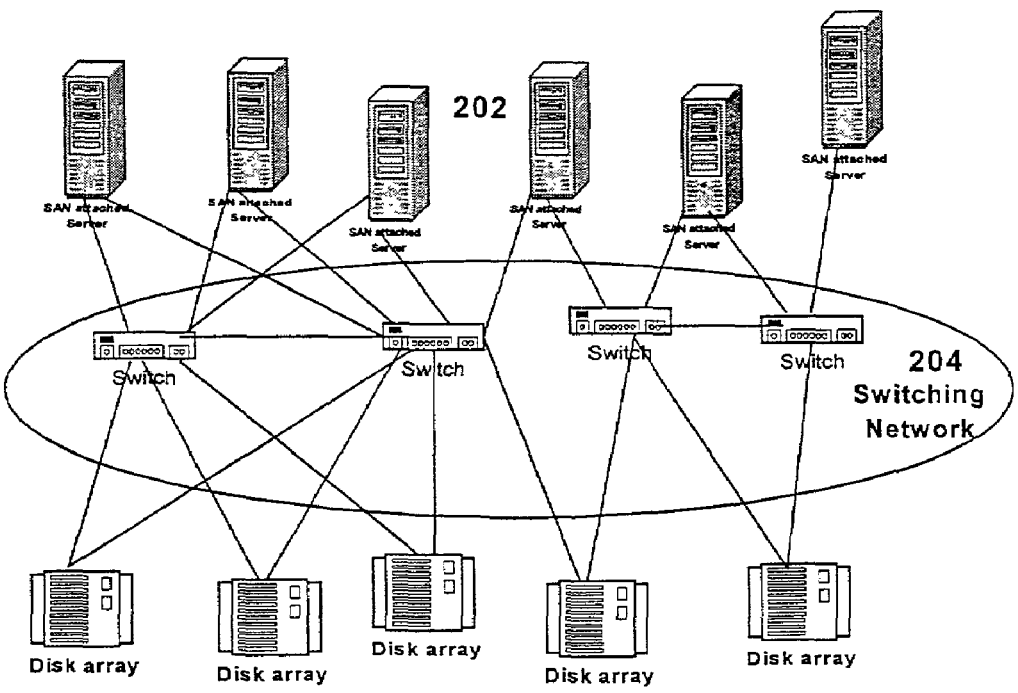
FIG. 2 illustrates the Storage Area Network (SAN) architecture of today.
Figure 4:
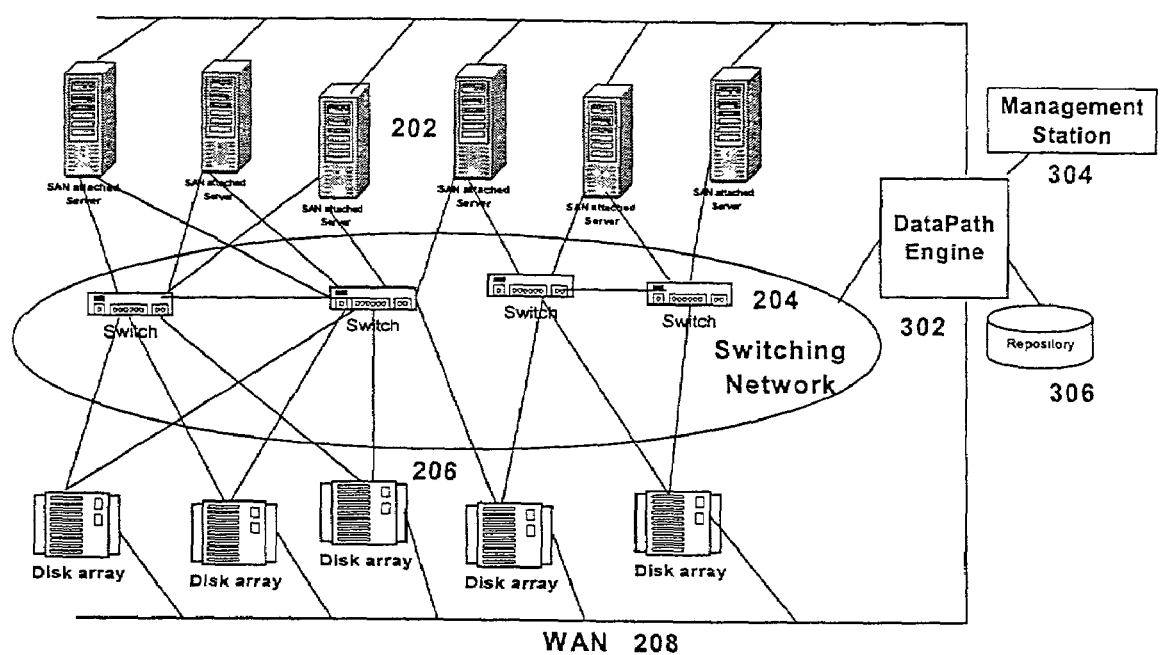
FIG. 4 is a block diagram illustrating a preferred embodiment for a system that performs automated storage provisioning.

FIG. 4 illustrates an embodiment in accordance with the invention in which DataPath Engine 302 is provided as part of (or closely coupled to, depending upon a particular embodiment) the SAN infrastructure; switching network 204, SAN attached servers 202, and storage infrastructure 206. DataPath Engine 302 operates in response to high-level SAN management commands entered by the operator via a Management Station 304 using a graphical user interface. The DataPath Engine is preferably operated as part of a general purpose computer server running any of several types of operating systems as well-known art; with one or more processing units; connected to the Wide Area Network (WAN) and switching network 204; and having attached a persistent repository 306. The DataPath Engine executes best with world-wide connectivity to SAN infrastructure via WAN and fibre channel connections and can be clustered with multiple computer servers for high availability and work load balancing. The management station is preferably operated as part of a specially programmed general purpose computer, such as a PC, workstation, mini-computer or other computing platform running any of several types of operating systems as well-known in the art. As well known, these platforms include one or more processing units for executing instructions obtained from memory (volatile or nonvolatile) and typically under control from signals provided through an I/O system. A display adapter typically maps memory contents of page frames for display on a monitor. Instructions and data for the executing instructions (program) and other data may be in the memory systems, which also includes removable media such as a portable magnetic media (e.g., floppy disk). The processing unit is able to communicate with other processing systems (e.g. the servers in the server architecture, devices in the switching/routing architecture, or devices in the storage architecture, typically by employing conventional networking protocols such as TCP/IP for example. These systems are well known to persons of ordinary skill in the art and will not be further explained herein.

DataPath Engine 302 is coupled to switch network 204 and WAN 208 and obtains knowledge of the identity and behavior of the specific devices in storage infrastructure 206 and applications on the SAN attached servers 202. This information is embedded, incorporated or otherwise associated within DataPath Engine 302, saved to a persistent repository, and obtained either by automated discovery or through manual configuration. Automated discovery includes polling and broadcasting across the WAN and switch network for devices to initially find devices; to find new devices added to the SAN infrastructure, and to continually collect status on the devices. The configuration and use of DataPath Engine 302 allows device management specifics to be hidden from the operator as it handles all the details of individual device management.

FIG. 5 illustrates procedures for automated storage provisioning by an operator using DataPath Engine 302. (This is in contrast to the discussion above concerning FIG. 3, which illustrates path allocation using conventional SAN management.) At step 351, DataPath Engine 302 automatically discovers SAN device configuration and status. At step 352, the operator selects a create data path command from a graphical interface along with policy. The embodiment of the command type is "Create a Virtual Private DataPath". A "Virtual Private DataPath (VPD)" is the term representing a data path coupled with a data volume meeting the template rules, and monitored constantly in order to implement policies specified. At step 353, DataPath Engine 302 selects the best candidate data volumes that meets the policy criteria. At step 354 the optimal candidate data paths are displayed for operator selection and the data path is set up based upon the operator's action. A data path represents the number of threads created between the application server and the data volume.

In this preferred embodiment, the pathing methodologies prioritize certain selection requirements over other possible candidates. In other embodiments, different selection requirements may produce different optimal paths. Optimal refers to a best fit of available resources to parameterized attributes based upon applicable prioritization conditions. In other embodiments and under different conditions, the recommended or optimal data path could be different, so best is used is a relative sense as opposed to an absolute sense.

Thus, it can be seen that an operator using the system illustrated in FIG. 4 can manage the SAN without having detailed knowledge of the SAN devices and quickly provision storage with a two-step command.

FIG. 6 illustrates rules that can be implemented as policy for data path selection. The policy includes, but is not limited to: Storage Type, 451, Number of Threads or Channels, 452, Number of Fabrics, 453, Bandwidth, 454, Data Volume Security, 455, Data Volume Action, 456, Fabric Security, 457, Fabric Action, 458, HBA Security, 459, HBA Action, 460, Data Volume Size, 461, DataVolume Pooling, 462, Data Volume Characteristics, 463, and Data Path Status, 464.

Figure 7A:
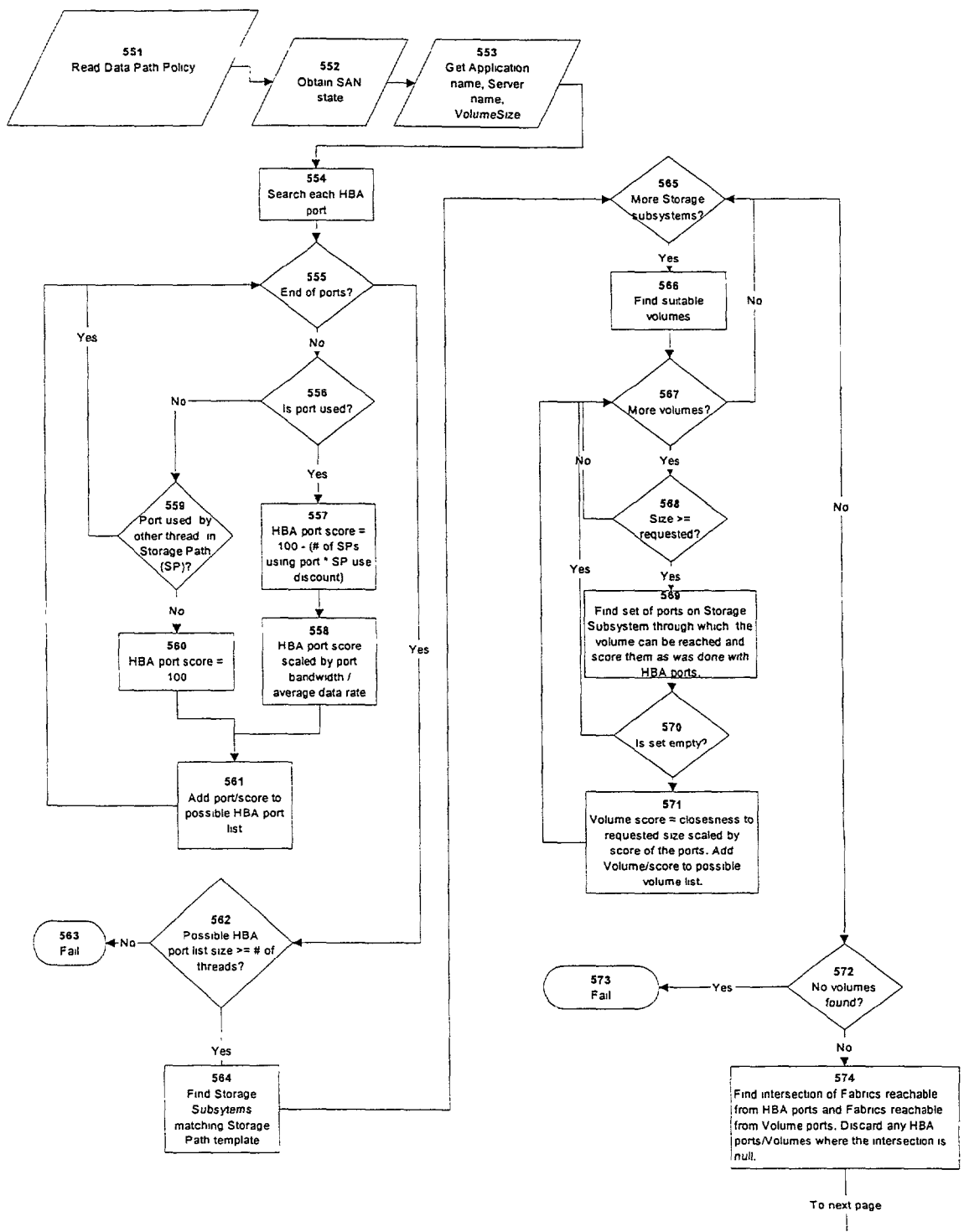
FIG. 7 is a layout showing connections for FIGS. 7A and 7B which together illustrate a flowchart of a pathing methodology used by DataPath Engine to select the optimal data path through a complex SAN infrastructure.
Figure 7B:
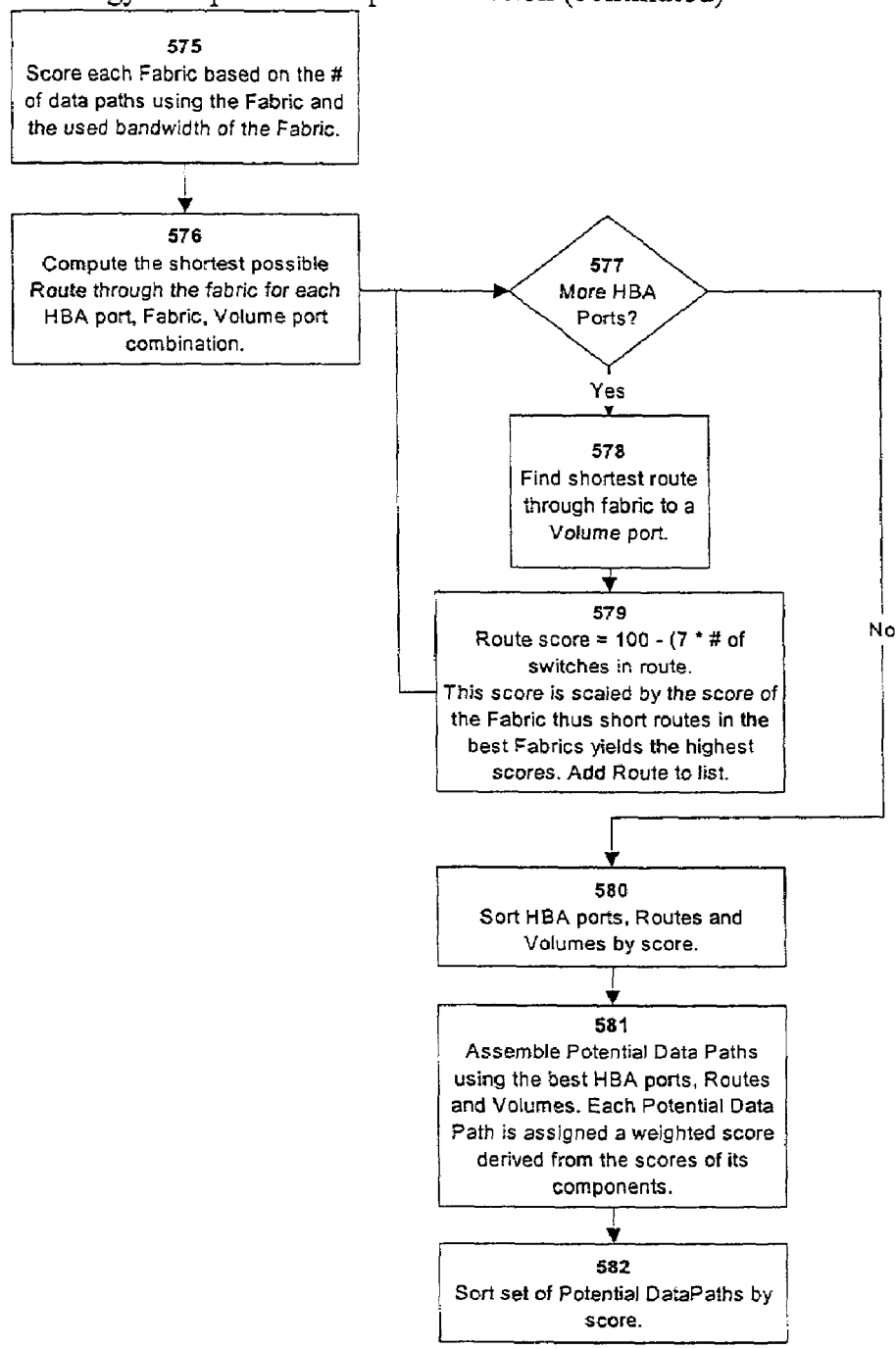

FIG. 7 illustrates a pathing methodology process 550 setting forth a preferred embodiment of how DataPath Engine 302 in FIG. 4 selects an optimal path. Process 550 first reads a data path policy 551, obtains a current SAN state 552, gets an application name and volume size desired from an operator 553, and initiates a search for data paths from each of the server's HBA ports 554.

The data path search 554 loops through each server HBA port 555, using the following steps: checks whether a port is used by any other data path 566; when already used, then gives the port a weighting 557, 558; when not used, checks to see whether used by another thread of this data path 559; and when not then gives the port the best ranking 560; and adds the port to candidate list 561.

Once all candidate ports have been identified, DataPath Engine 302 determines whether the number of HBA ports is equal to or greater than the number of threads specified in the policy 562, and when not, it fails (Step 563). Otherwise it searches for storage subsystems that match the policy requirements 564.

The data volume search loops through each storage subsystem 565, and determines whether there are suitable data volumes 566. The DataPath Engine 302 loops through each data volume 567, and when the size is acceptable 568, and the data volume is accessible 569, it gives the data volume a ranking 571. When no data volumes are found 572, then it fails 573. All data volumes inaccessible from the server HBA are then discarded 574.

Next DataPath Engine 302 ranks each switch fabric 575, and computes the shortest data path 576. For each HBA port on the server 577, it finds the shortest route through the fabric to the data volume 578, and ranks the data path 579. Finally, DataPath Engine 302 calculates and sorts data paths by their ranking 580, 581, 582.

Figure 8:
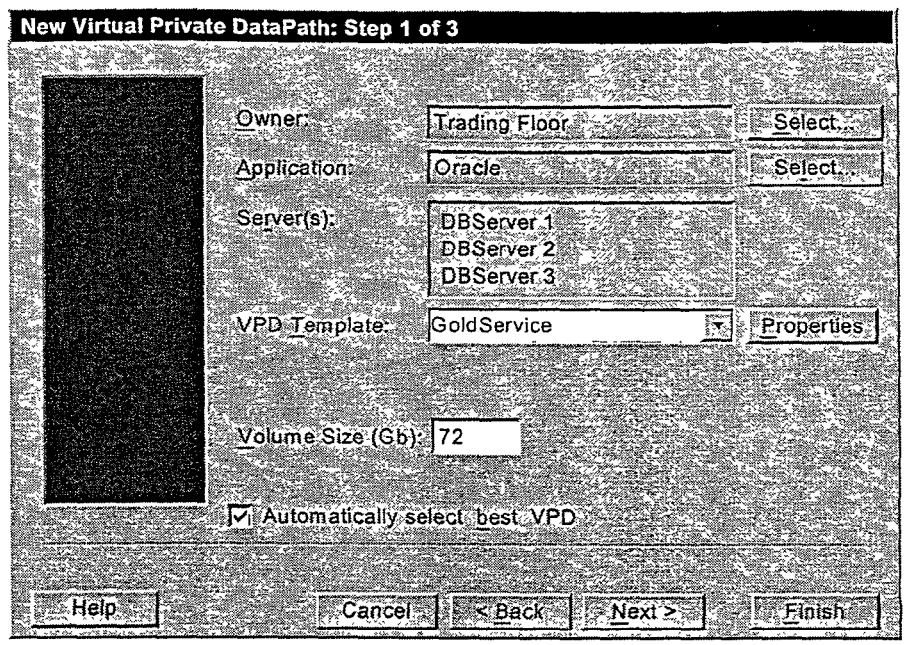
FIG. 8 is an illustration of a graphical user interface 800 for, in the preferred embodiment, provisioning a data path.

FIG. 8 is an illustration of a graphical user interface 800 for, in the preferred embodiment, parameterizing a set of attributes for a desired data path. Interface 800 is coupled to DataPath Engine 302 and may be part of management station 304. The preferred embodiment uses a simple set of data entry screens 800 and those shown in FIGS. 9-11, to guide an operator in the definition and creation of an optimal data path (the path from the application on the server to the data volume on a storage subsystem). Interface 800 includes data based upon the context from which the operator requested to create the optimal data path. For example, when the operator has the owner view for "Trading Floor" currently opened, the owner information of interface 800 contains "Trading Floor." The operator is able to override any field. In some cases, interface 800 is prepopulated (or preloaded) with policy information or template information.

Figure 9:
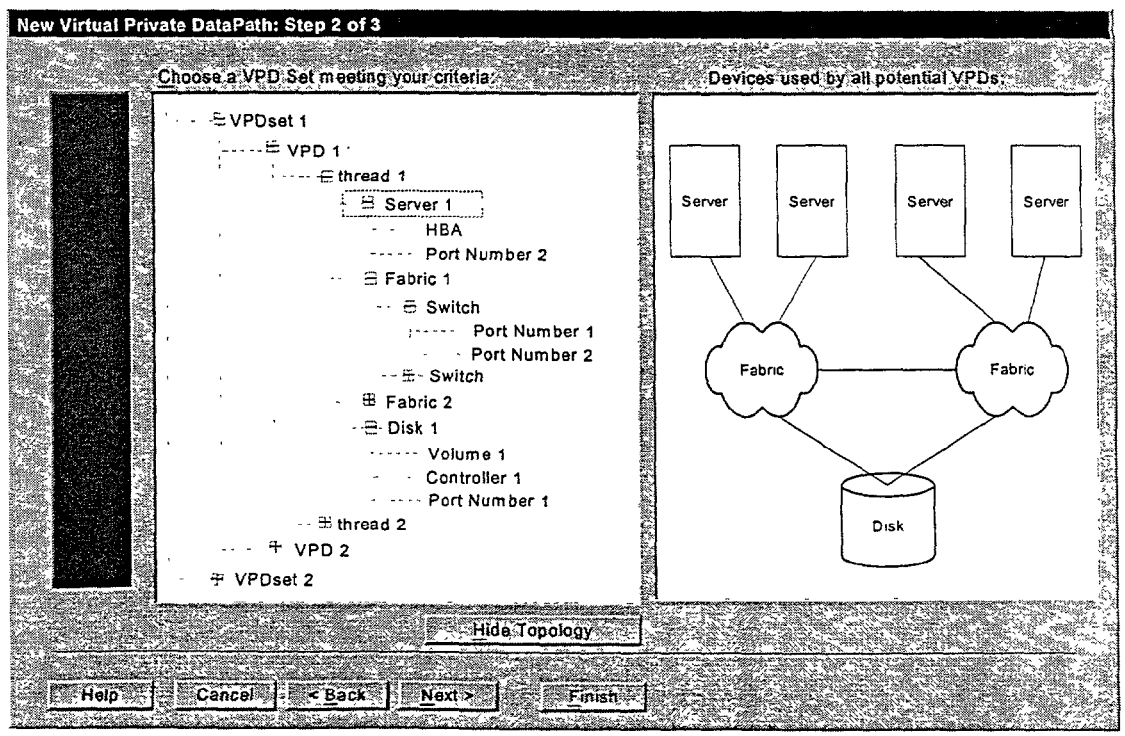
FIG. 9 is an illustration of interface 800 after the operator has selected 'Next' from interface 800 configuration illustrated in FIG. 8.
Figure 10:
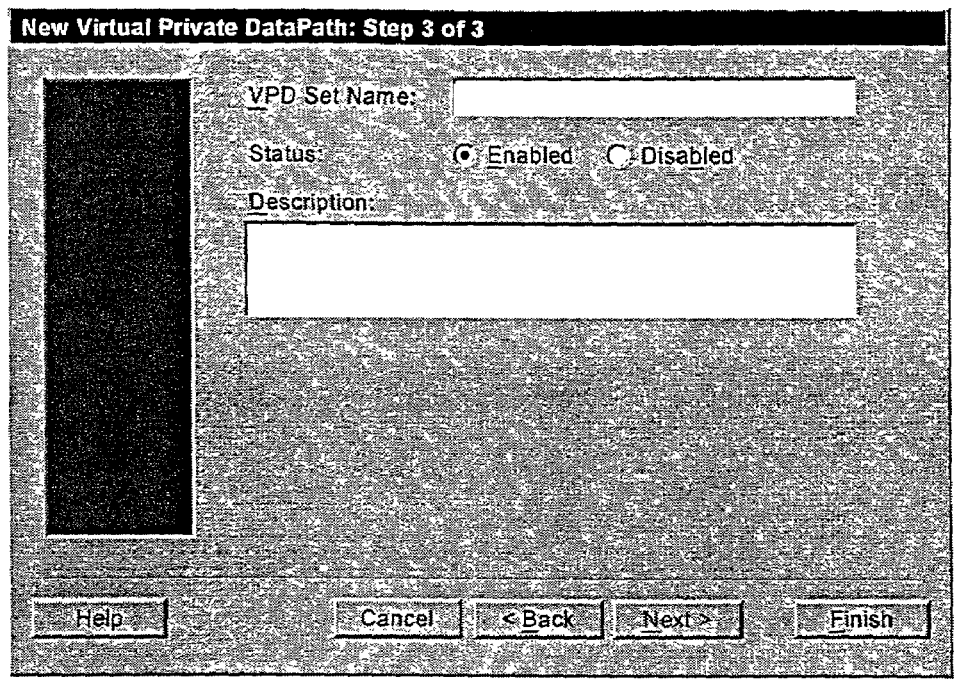
FIG. 10 is an illustration of interface 800 after the operator has selected 'Next' from interface 800 configuration illustrated in FIG. 9.

FIG. 8 through FIG. 10 illustrate a data path creation scenario for a preferred embodiment. FIG. 8 describes an interface 800 that is populated with information to serve as an example. Interface 800 includes a data path template "GoldService" identifying and specifying rules about data path creation that hides the complexity and details of the storage and switching network architectures from the operator. The template includes information such as the number of threads, the security levels, default data volume size, etc. The provisioning can be done on behalf of an application executing on one server or a cluster of servers. In this example the operator is creating a data path from the application, Oracle, which is executing on a cluster consisting of three servers (DBserver1, DBserver2, DBserver3). The size requested is 72GB. The owner of the data path is the Trading Floor. Included in interface 800 is the concept of data path owner, which for purposes of this application, is defined to include a name of a customer or line of business within an enterprise and information about that organization such as a contact person, their email address for automatic notification, their address, applications which are associated with the owner and default templates that are associated with the owner.

FIG. 9 is an illustration of interface 800 after the operator has selected 'Next' from interface 800 configuration illustrated in FIG. 8, if "automatically select best VPD" is not checked. After the operator selects Next, the DataPath Engine 302 searches the SAN and switching infrastructure for candidate data volumes and the best data paths from each server to candidate data volumes. The best data path candidates will be selected using the pathing methodologies specified in FIG. 7. FIG. 9 illustrates that interface 800 now displays a set of data path candidate sets, including best data path candidate (determined as the candidate data path matching the rules and policies most closely) to each server, and alternates. The operator selects an alternate set or continues to the Next screen which automatically selects the default best candidate data paths.

FIG. 10 an illustration of interface 800 after the operator has selected 'Next' from interface 800 configuration illustrated in FIG. 9. Once the operator selects Next from the previous interface 800 configuration, interface 800 provides the operator with an opportunity to name the data path and to provide a description. After the DataPath Engine 302 creates the identified data path, the DataPath Engine 302 notifies the operator.

Figure 11:
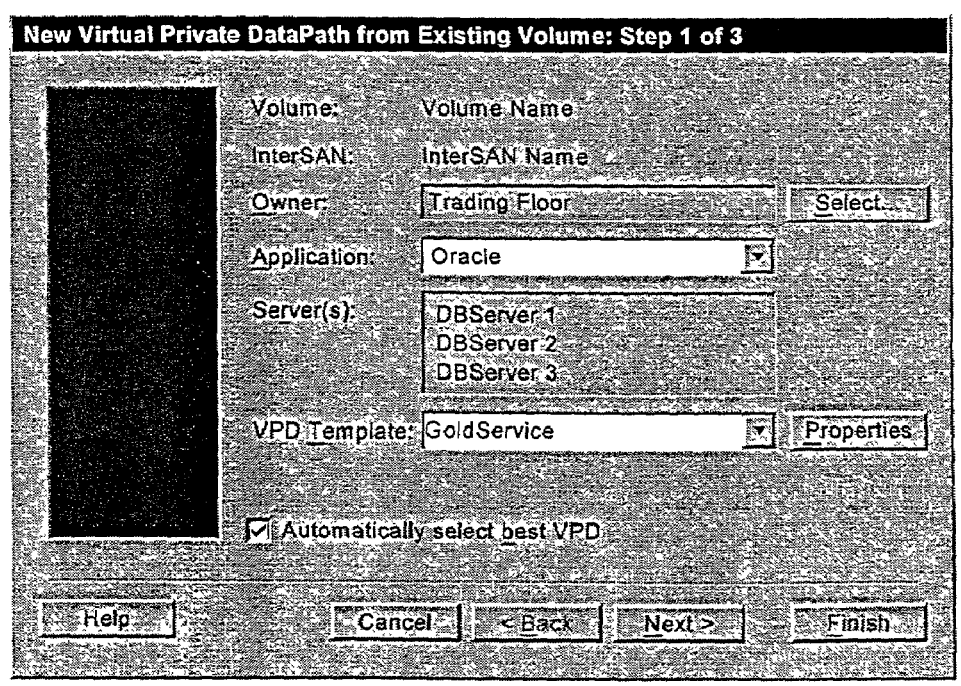
FIG. 11 is illustrates an alternate preferred embodiment for creation of a data path. In this case, a data path is desired to an existing data volume, already being used by another server.

FIG. 11 illustrates an alternate preferred embodiment for creation of a data path. In this case, a data path is desired to an existing data volume, already being used by another server. This is a common case with clusters of servers that must all access the same data for a shared application. In this case interface 800 is configured as shown in FIG. 11 and is used in place of interface 800 illustrated in FIG. 8. Other than the data volume preexist, the subsequent steps in the data path creation process do not have to be changed.

It should be noted that the embodiments described here may be implemented in hardware, software, firmware or some combination thereof. While particular embodiments have been described, the scope of the invention is not to be limited to any particular embodiment. Rather, the scope of the invention is to be determined from the claims.

What is claimed is:

1. A method of creating a data path for a process executing on a server coupled to a storage area network (SAN), the SAN providing connectivity between the server and a storage device in the SAN, the method comprising:
parameterizing a set of attributes for a desired data path between the process and the storage device of the SAN, wherein the set of attributes includes:
a detail about at least one data volume;
a performance setting; and
a policy setting; and
constructing the data path that provides said set of attributes, wherein said constructing step further comprises:
searching the SAN for a set of candidate storage devices;
identifying a candidate data path from the server to each candidate storage device of said set of candidate storage devices;
evaluating each said candidate data path against the set of attributes to rank said candidate data paths from a best candidate data path to a least best candidate data path according to the attributes, wherein the act of evaluating each said candidate data path against the set of attributes includes ranking all of the switch fabrics in the SAN; and
selecting said best candidate data path as the data path to be constructed by said constructing step.

2. The method of claim 1 wherein said set of attributes includes a pre-defined template.

3. The method of claim 2 wherein said set of attributes includes a data path owner, application, and the server on which the application is executing.

4. The method of claim 2 wherein said pre-defined template specifies a set of performance, availability, and cost metrics for the desired data path.

5. A method of creating a data path for a process executing on a server coupled to a storage area network (SAN), the SAN providing connectivity between the server and a storage device in the SAN, the method comprising:
parameterizing a set of attributes for a desired data path between the process and the storage device of the SAN, wherein the set of attributes includes:
a detail about at least one data volume;
a performance setting; and
a policy setting; and
constructing the data path that provides said set of attributes, wherein said constructing step further comprises:
searching the SAN for a set of candidate storage devices;
identifying a candidate data path from the server to each candidate storage device of said set of candidate storage devices;
evaluating each said candidate data path against the set of attributes to rank said candidate data paths from a best candidate data path to a least best candidate data path according to the attributes; and
selecting said best candidate data path as the data path to be constructed by said constructing step, wherein:
said pre-defined template specifies a set of performance, availability, and cost metrics for the desired data path,
said set of attributes includes a pre-defined template, and
said set of performance and availability metrics includes at least one of a number of threads, a security level, and a default volume size and characteristics, default path characteristics.

6. The method of claim 1 wherein said parameterizing step includes a step of entering a user-defined attribute for inclusion in said set of attributes.

7. The method of claim 6 wherein said entering step includes entry of said user-defined attribute by use of a graphical user interface coupled to the SAN.

8. The method of claim 1, further comprising:
connecting the SAN to a Wide Area Network (WAN) through a general purpose computer; and
communicating with another processing system through the WAN using the general purpose computer.

9. The method of claim 1, wherein the set of attributes includes a level of security.

10. The method of claim 9, wherein the level of security includes a data volume security.

11. The method of claim 10, wherein the data volume security includes whether the data volume is secure or open.

12. The method of claim 9, wherein the level of security includes a fabric security.

13. The method of claim 9, wherein the level of security includes a host bus adapter security.

14. The method of claim 1, wherein the set of attributes includes a data volume size.

15. The method of claim 1, wherein the set of attributes includes an end point storage type.

16. The method of claim 1, wherein the set of attributes includes a number of threads.

17. The method of claim 1, wherein the set of attributes includes a number of fabrics.

18. The method of claim 1, wherein the set of attributes includes a bandwidth attribute.

19. The method of claim 18, wherein the bandwidth attribute specifies whether each thread must be exclusive or shared.

20. The method of claim 1, wherein the set of attributes includes a cost characteristic.

21. The method of claim 20, wherein the set of attributes includes a cost characteristic that considers a percentage of a device used by a data path.

22. The method of claim 1, wherein the set of attributes includes a device uptime characteristic.

23. The method of claim 22, wherein the device uptime characteristic includes data describing when a devices is available and unavailable.

24. The method of claim 1, wherein the set of attributes includes a rate of data that an application is experiencing.

25. The method of claim 1, wherein the set of attributes includes a number of threads, a number of switch fabrics, and a level of security.

26. The method of claim 1, wherein the act of evaluating each said candidate data path against the set of attributes includes ranking at least two data volumes in the SAN.

27. The method of claim 26, wherein the act of evaluating each said candidate data path against the set of attributes includes ranking all of the data volumes in the SAN.

28. A method of creating a data path for a process executing on a server coupled to a storage area network (SAN), the SAN providing connectivity between the server and a storage device in the SAN, the method comprising:
parameterizing a set of attributes for a desired data path between the process and the storage device of the SAN, wherein the set of attributes includes:
a detail about at least one data volume;
a performance setting; and
a policy setting; and
constructing the data path that provides said set of attributes, wherein said constructing step further comprises:
searching the SAN for a set of candidate storage devices;
identifying a candidate data path from the server to each candidate storage device of said set of candidate storage devices;
evaluating each said candidate data path against the set of attributes to rank said candidate data paths from a best candidate data path to a least best candidate data path according to the attributes, wherein the act of evaluating each said candidate data path against the set of attributes includes determining whether a port is used by another data path, and assigning a weighting based on whether the port is used by another data path; and
selecting said best candidate data path as the data path to be constructed by said constructing step.

29. A method of creating a data path for a process executing on a server coupled to a storage area network (SAN), the SAN providing connectivity between the server and a storage device in the SAN, the method comprising:
parameterizing a set of attributes for a desired data path between the process and the storage device of the SAN; and
constructing the data path that provides said set of attributes, wherein said constructing step further comprises:
identifying candidate data paths from the server to each candidate storage device of said set of candidate storage devices;
evaluating each said candidate data path against the set of attributes to rank said candidate data paths from a best candidate data path to a least best candidate data path according to the attributes, wherein a destination storage volume of each candidate data path is ranked, wherein a switch fabric of each candidate data path is ranked separately from the storage destination storage volume rank, wherein the rank of the candidate data path is based on both the rank of a corresponding destination storage volume and the rank of a corresponding switch fabric; and
selecting said best candidate data path as the data path to be constructed by said constructing step.

30. The method according to claim 29, further comprising presenting said ranked candidate data paths to a user for selection; and wherein the best candidate data path a user-selected candidate data path as the data path to be constructed by said constructing step.

31. The method of claim 28 wherein said set of attributes includes a pre-defined template.

32. The method of claim 31 wherein said pre-defined template specifies a set of performance, availability, and cost metrics for the desired data path.

33. The method of claim 28 wherein said set of attributes includes a data path owner, application, and the server on which the application is executing.

34. The method of claim 28 wherein said parameterizing step includes a step of entering a user-defined attribute for inclusion in said set of attributes.

35. The method of claim 34 wherein said entering step includes entry of said user-defined attribute by use of a graphical user interface coupled to the SAN.

36. The method of claim 28 wherein said constructed data path includes all physical, logical and security component identification and configuration information sufficient to operably link the process to an identified data volume of the SAN.

37. The method of claim 28, further comprising:
connecting the SAN to a Wide Area Network (WAN) through a general purpose computer; and
communicating with another processing system through the WAN using the general purpose computer.

38. The method of claim 28, wherein the set of attributes includes a level of security.

39. The method of claim 38, wherein the level of security includes a data volume security.

40. The method of claim 39, wherein the data volume security includes whether the data volume is secure or open.

41. The method of claim 38, wherein the level of security includes a fabric security.

42. The method of claim 38, wherein the level of security includes a host bus adapter security.

43. The method of claim 28, wherein the set of attributes includes a data volume size.

44. The method of claim 28, wherein the set of attributes includes an end point storage type.

45. The method of claim 28, wherein the set of attributes includes a number of threads.

46. The method of claim 28, wherein the set of attributes includes a number of fabrics.

47. The method of claim 28, wherein the set of attributes includes a bandwidth attribute.

48. The method of claim 47, wherein the bandwidth attribute specifies whether each thread must be exclusive or shared.

49. The method of claim 28, wherein the set of attributes includes a cost characteristic.

50. The method of claim 28, wherein the set of attributes includes a cost characteristic that considers a percentage of a device used by a data path.

51. The method of claim 28, wherein the set of attributes includes a device uptime characteristic.

52. The method of claim 51, wherein the device uptime characteristic includes data describing when a devices is available and unavailable.

53. The method of claim 28, wherein the set of attributes includes a rate of data that an application is experiencing.

54. The method of claim 28, wherein the set of attributes includes a number of threads, a number of switch fabrics, and a level of security.

55. The method of claim 28, wherein the act of evaluating each said candidate data path against the set of attributes includes ranking at least two data volumes in the SAN.

56. The method of claim 28, wherein the act of evaluating each said candidate data path against the set of attributes includes ranking all of the data volumes in the SAN.

* * * * *

UNITED STATES PATENT AND TRADEMARK OFFICE
CERTIFICATE OF CORRECTION

PATENT NO. : 7,343,410 B2
APPLICATION NO. : 09/896408
DATED : March 11, 2008
INVENTOR(S) : Mercier et al.

It is certified that error appears in the above-identified patent and that said Letters Patent is hereby corrected as shown below:

Column 1
Line 28, change "compute" to --computer--
Line 64, change ""Today," to --Today,--

Column 2
Line 8, change "settings."" to --settings.--
Line 25, change "Step 255 and 256" to --At step 257, steps 255 and 256--

Column 3
Line 4, change ""A" to --A--
Line 19, change "details."" to --details.--
Line 24, change "Data Path" to --DataPath--

Column 5
Line 36, change ""Automated" to --Automated--
Line 45, change "path."" to --path.--

Column 7
Line 4, after "repository", add [306]
Line 6, after "WAN", add [208]
Line 7, after "network", add [204]
Line 63, change "566" to --556--

Column 8
Line 21, delete "800"
Line 23, change "interface 800" to --The interface--
Line 26, delete "800"
Line 29, change "interface 800" to --The interface--
Line 33, change "interface 800" to --the interface--
Line 39, delete "800"
Line 40, change "interface 800" to --The interface--

Signed and Sealed this

Twenty-seventh Day of July, 2010

David J. Kappos
*Director of the United States Patent and Trademark Office*

Line 52, change "interface 800" to --the interface--
Line 60, change "interface 800" to --the interface--
Line 61, change "interface 800" to --the interface--

Column 9
Line 1, change "interface 800" to --the interface--
Line 8, change "interface 800" to --the interface--
Line 9, change "interface 800" to --the interface--
Line 11, delete first "800", change second "interface "800" to --the interface--
Line 21, change "interface 800" to --the interface--
Line 22, change "interface 800" to --the interface--